United States Patent [19]

Pitts

[11] Patent Number: 4,639,015
[45] Date of Patent: Jan. 27, 1987

[54] Z-NECK, T-BAR TRAILER

[76] Inventor: John A. Pitts, 1600 Rosharon Rd., Lot #32, Alvin, Tex. 77511

[21] Appl. No.: 767,092

[22] Filed: Aug. 19, 1985

[51] Int. Cl.$^4$ ............................................. B62D 63/06
[52] U.S. Cl. .................................. 280/789; 280/423 B; 280/425 R; 280/433; 280/656
[58] Field of Search .................... 280/789, 656, 423 B, 280/425 A, 433, 423 R, 438 R, 438 A, 415 R, 415 A, 415 B

[56] References Cited

U.S. PATENT DOCUMENTS

| | | | |
|---|---|---|---|
| 1,821,395 | 9/1931 | Musslewhite | 280/789 |
| 1,959,168 | 5/1934 | Linn | 280/789 |
| 3,164,398 | 1/1965 | Lugash | 280/423 R |
| 3,287,038 | 11/1966 | Candlin, Jr. et al. | 280/433 |
| 3,392,992 | 7/1968 | Baker et al. | 280/423 R |
| 3,587,890 | 6/1971 | Hyland et al. | 280/789 |
| 3,913,933 | 10/1975 | Visser et al. | 280/656 |

Primary Examiner—John J. Love
Assistant Examiner—Kenneth R. Rice
Attorney, Agent, or Firm—Harvey B. Jacobson

[57] ABSTRACT

A multi-axle trailer is provided for transporting large, heavy and bulky loads. The trailer includes a load supporting frame portion which is longitudinally extendible both rearwardly and forwardly relative to the axles and the forward end of the frame includes a forwardly projecting and extendible tongue terminating forwardly in an upright post in turn terminating upwardly in a forwardly projecting horizontal neck portion provided with trailer coupling structure at its forward end. Opposite side inclined braces have their upper ends anchored relative to corresponding opposite side portions of the neck portion forwardly of the post, lower end portions anchored relative to opposite side portion of the tongue rearward of the post and longitudinal mid-portions anchored relative to opposite side mid-portions of the post.

9 Claims, 9 Drawing Figures

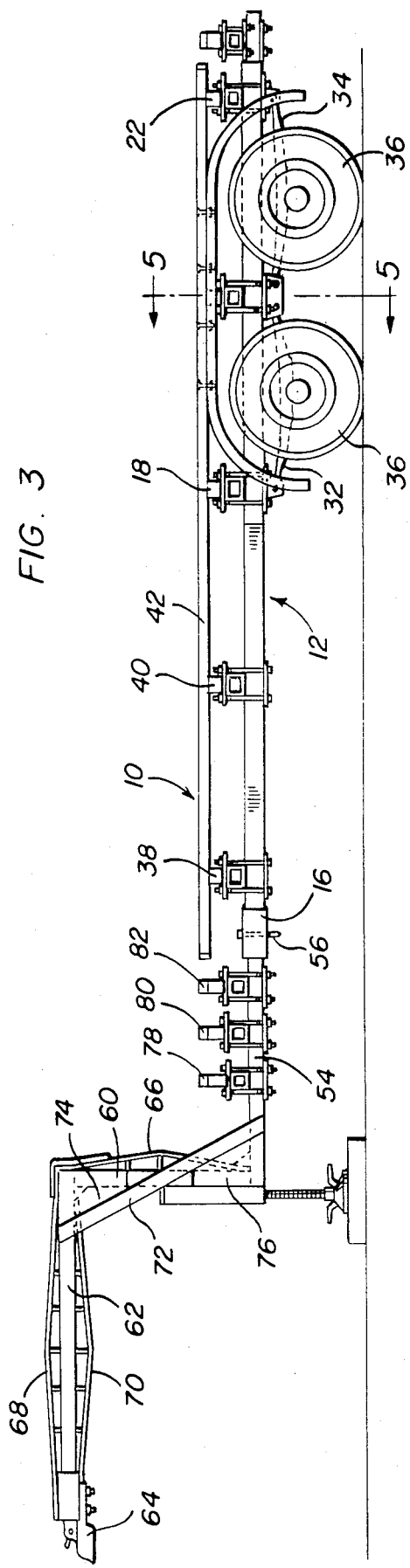
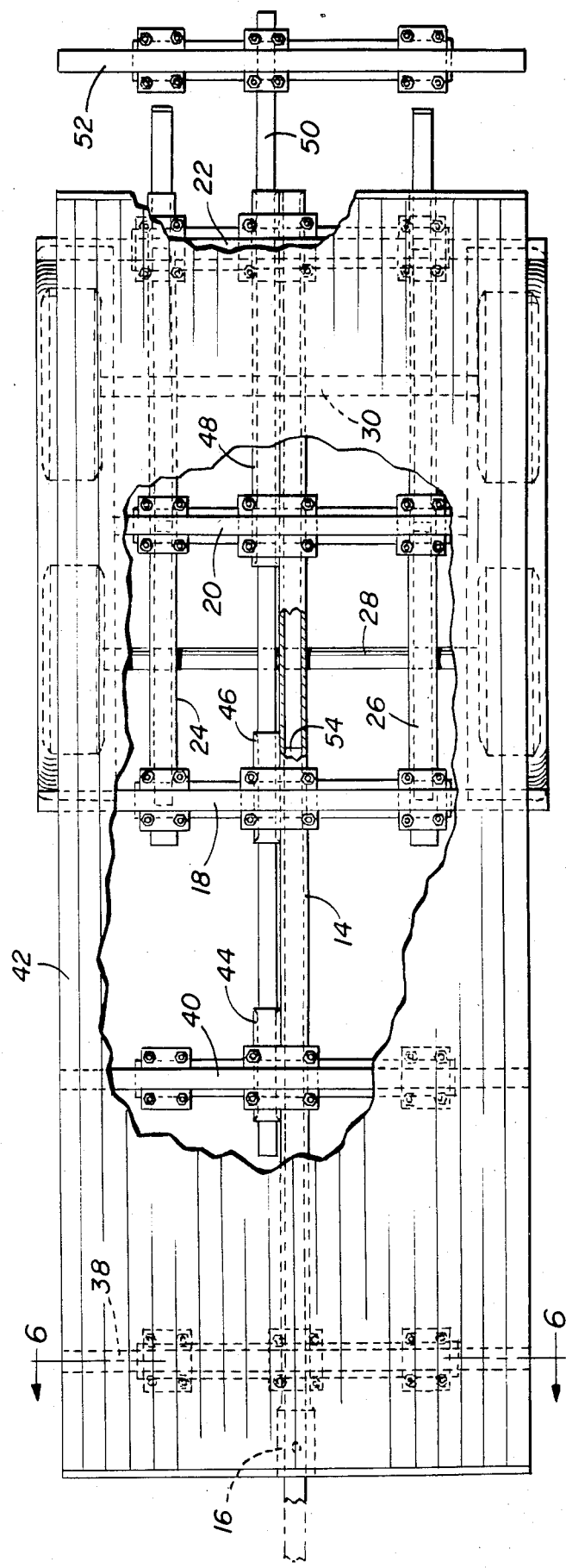
FIG. 3
FIG. 4

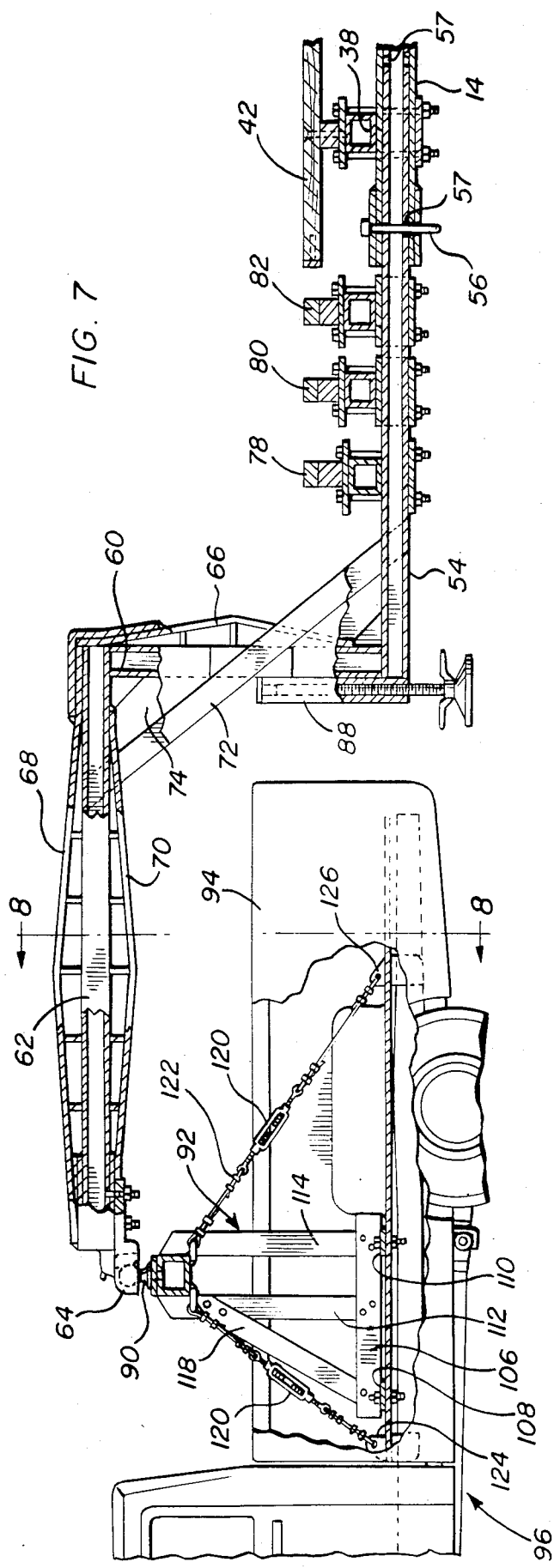

Z-NECK, T-BAR TRAILER

BACKGROUND OF THE INVENTION

1. Field of the Invention

This invention relates to a multi-axle high load capacity trailer including a load bed which is both forwardly and rearwardly extendible relative to the trailer axles and also equipped with an extendible towing tongue incorporating novel Z-type bracing. Also, the invention further includes an improved two hitch for mounting in the bed of a pickup truck and including a trailer hitch coupling member disposed appreciably forward of the rear axle of the pickup truck and at an elevation spaced appreciably above the pickup truck load bed.

2. Description of Related Art

Various different forms of extendible trailer load beds as well as other wheeled vehicle load beds heretofore have been provided. In addition, various different forms of extendible trailer tongue portions and trailer tongues heretofore have been provided. The trailer of the instant invention, however, combines these features in a novel manner to provide a high load capacity trailer including multiple axles and with the frame of the trailer adjustable in length rearward and forward of the axles for proper longitudinal positioning of a load on the trailer. Further, the tongue of the trailer is uniquely braced to withstand the heavy loading thereon associated with a high load capacity trailer and the pickup truck mounted hitch assembly has been specifically designed to evenly distribute and properly longitudinally locate the heavy loading of the trailer on the pickup truck.

SUMMARY OF THE INVENTION

The trailer of the instant invention has been specifically designed to handle large bulky and heavy loads and is equipped with multiple axles as well as a frame spring supported from the axles and extendible both rearwardly and forwardly relative to the axles for ease in properly distributing the weight of a large bulky load on the trailer. The forward extendible portion of the frame incorporates a towing tongue including novel Z-type bracing.

The main object of this invention is to provide a high load capacity trailer of the multiple axle type and wherein the load supporting bed or frame of the trailer may be extended both forwardly and rearwardly relative to the axles.

Another object of this invention is to provide a rearwardly and forwardly extendible trailer frame wherein the rearward and forward extendible frame portions include multiple load bunks adjustably positionable therealong to thereby enable proper positioning of the load bunks according to predetermined support areas of a load to be carried by the trailer.

Still another important object of this invention is to provide a trailer incorporating a tongue having novel bracing to minimize flexing of the tongue and to also appreciably increase the load carrying capacity thereof.

A further object of this invention is to provide a fifth wheel-type hitch assembly for the load bed of a pickup truck and mountable in an associated pickup truck load bed in a manner such that the coupling connection between the hitch assembly and an associated trailer will be disposed appreciably forward the rear axle of the associated pickup truck and disposed at an elevation appreciably above the pickup load bed.

A final object of this invention to be specifically enumerated herein is to provide a high load capacity trailer in accordance with the preceding objects and which will conform in conventional forms of manufacture be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged side elevational view of the trailer with the front and rear extendible portions thereof in retracted positions;

FIG. 4 is a further enlarged top plan view of the rear portion of the trailer with the rearwardly extendible trailer frame portion in a partially extended position and the main decking of the trailer as well as the center longitudinal beam of the trailer having parts thereof being broken away and illustrated in horizontal section;

FIG. 7 is an enlarged fragmentary longitudinal sectional view of the forward portion of the trailer and the rear portion of the associated pickup truck;

FIG. 8 is a transverse sectional view taken substantially upon the section line 8—8 of FIG. 7.

DESCRIPTION OF THE PREFERRED EMBODIMENT

Figure 1:
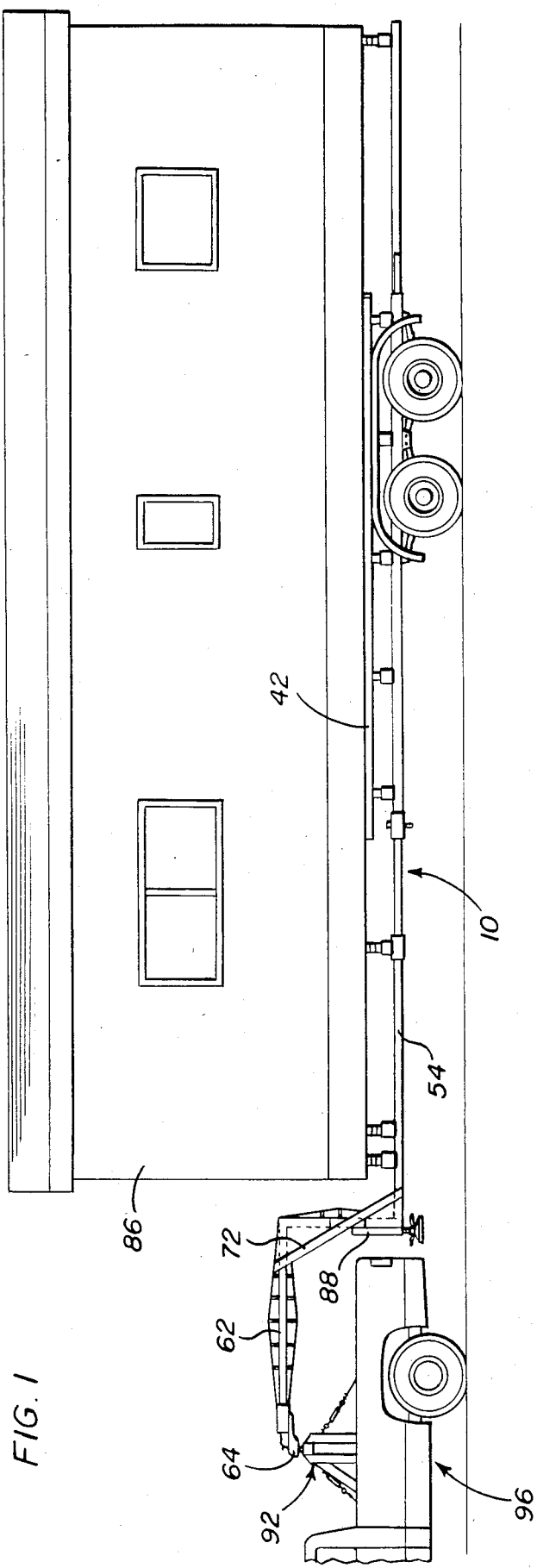
FIG. 1 is a side elevational view of the trailer of the instant invention as well as the rear portion of a pickup truck to which the trailer is coupled through the utilization of a hitch assembly specifically constructed for use in conjunction with the trailer.
Figure 2:
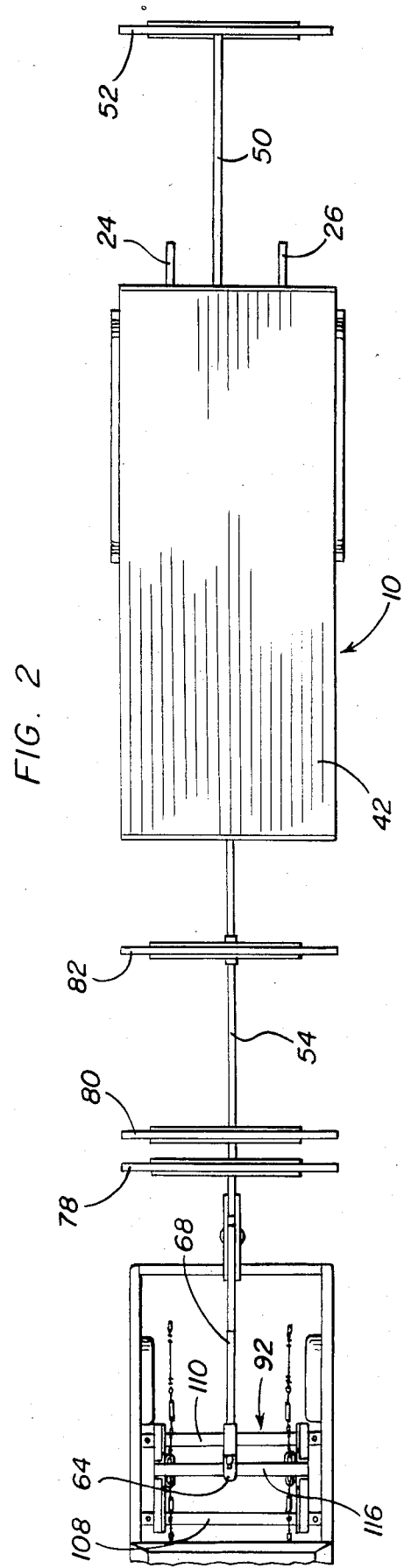
FIG. 2 is a top plan view of the assemblage illustrated in FIG. 1, but with the load removed from the trailer.
Figure 5:
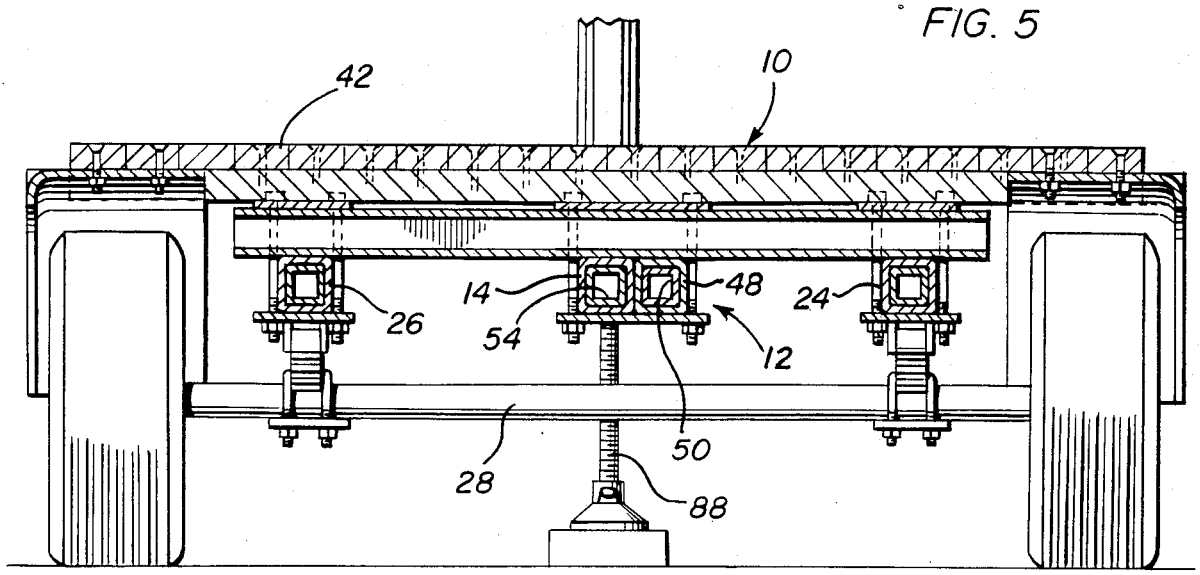
FIG. 5 is an enlarged transverse vertical sectional view taken substantially upon the plane indicated by the section line 5—5 of FIG. 3.
Figure 6:
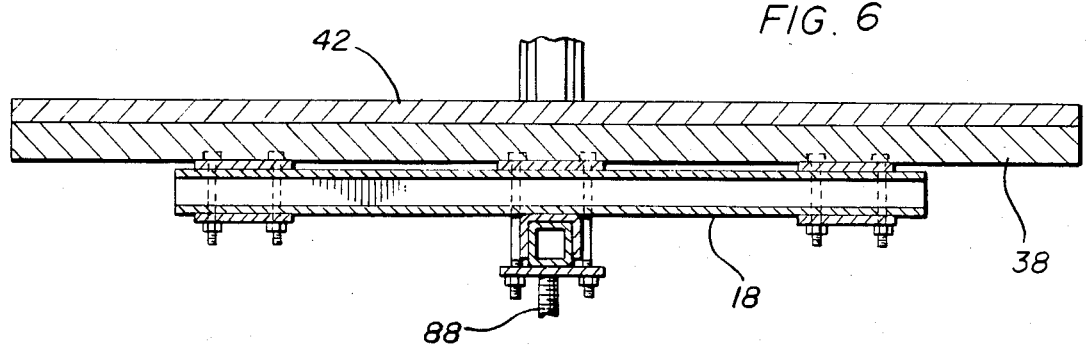
FIG. 6 is an enlarged fragmentary transverse vertical sectional view taken substantially upon the plane indicated by the section line 6—6 of FIG. 4.

Referring now more specifically to the drawings, the numeral 10 generally designates the high load capacity and rearwardly and forwardly extendible trailer of the instant invention. The trailer 10, as may best be seen from FIGS. 3 and 4 of the drawings, includes a central tubular longitudinal frame member 14 equipped with a transversely enlarged tubular coupling 16 on its forward end. The rear end portion of the frame member 14 has three longitudinally spaced and transversely extending transverse frame members 18, 20 and 22 secured thereto and corresponding ends of the transverse frame members are connected by rear longitudinal frame members 24 and 26 laterally spaced outwardly of the opposite sides of the frame member 14. Tandem axles 28 and 30 are supported from the opposite end portions of the frame members 24 and 26 by leaf springs 32 and 34 and the axles 28 and 30 include opposite end wheels 36 journalled therefrom.

The forward end portion of the central frame member 14 includes additional transverse frame members 38 and 40 supported therefrom and a load supporting decking 42 is supported from the transverse frame members 18, 20, 22, 38 and 40. In addition, a first front tubular guide 44 is supported from the frame member 14 at its intersection with the frame member 40, a second tubular guide 46 is supported from the frame member 14 at its intersection with the frame member 18 and a third rear tubular guide 48 is supported from the rear end portion of the frame member 14 and the transverse members 20 and 22, the guides 44, 46 and 48 being longitudinally aligned and slidingly receiving the forward end portion of a rear rearwardly extendible frame member 50 therefrom, the rear end of the frame member 50 supporting a transverse load supporting bunk 52 therefrom. In addition, any suitable means (not shown) may be used to maintain the frame member 50 in adjusted longitudinally extended position relative to the rear end of the frame 12 and opposite end portions of the bunk 52 may rest and be supported upon the rear terminal ends of the frame members 24 and 26 when the frame member 50 is fully forwardly retracted to the position thereof illustrated in FIG. 3.

The forward end of the frame 12 includes a forwardly projecting tongue 54 whose rear end is slidingly telescopingly received within the frame member 14. The tubular coupling 16 is equipped with a removal through pin 56 and the through pin 56 may be passed through longitudinally spaced vertical bores 57 formed in the rear end portion of the tongue 54 for maintaining the tongue 54 in adjusted extended positions. When the tongue 54 is in its rearmost retracted position, the rear end of the tongue 54 is disposed slightly forward of the axle 28, see FIG. 4.

The forward end of the tongue 54 includes an upright post 60 supported therefrom and terminating upwardly in a forwardly directed horizontal neck 62 provided with a socket hitch assembly 64 at its forward end. The upright post 60 includes rear truss bracing 66 and the neck 62 includes both upper and lower truss bracing 68 and 70. In addition, the upright post 60 is braced relative to the neck 62 and the tongue 64 by opposite side forwardly and upwardly inclined brace members 72 having their upper ends anchored relative to corresponding opposite side portions of the neck 62 forwardly of the upright post 60 and their rear ends anchored to corresponding opposite side portions of the tongue 54 rearward of the lower end of the post 60. In addition, the vertical mid-portions of the brace members 72 are anchored to corresponding opposite side portions of the vertical mid-portion of the upright post 60 and pairs of opposite side upper gusset plates 74 are secured between opposite side portions of the post 60 and neck 62 as well as the brace member 72 and opposite side lower gusset plates 76 are secured between opposite side portions of the lower end of the post 60 and the forward end of the tongue 54 as well as the lower ends of the brace members 72.

The tongue 54 includes three transversely extending load supporting bunks 78, 80 and 82 supported therefrom and adjustable longitudinally therealong. Further, the bunk 52 is adjustable longitudinally of the frame member 50. In this manner, the bunks 52, 78, 80 and 82 may be selectively positioned along the frame member 50 and the tongue 54 for proper placement under load supporting areas of a bulky load 86 carried by the trailer 10, see FIG. 1. The height of the bunks 52, 78, 80 and 82 is the same as the height of the decking 42. Further, the lower end of the upright 60 includes a manually operable jack 88 which may be used to support the forward end of the tongue 54 from the ground upon which the wheels 36 rest.

Figure 9:
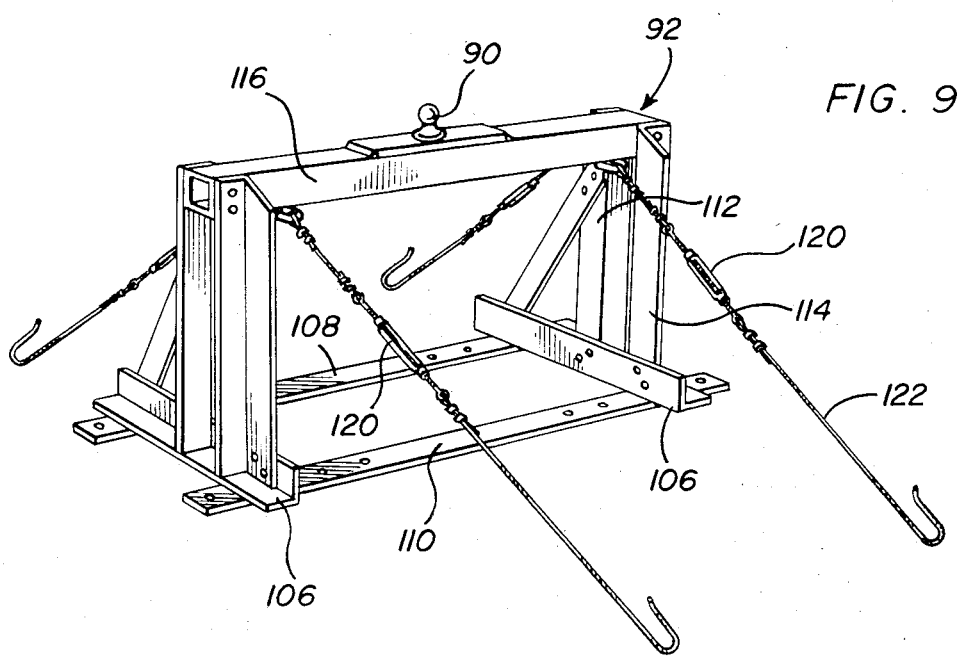
FIG. 9 is a perspective view of the pickup truck mounted fifth wheel-type hitch assembly of the instant invention.

With attention now invited more specifically to FIGS. 7, 8 and 9 of the drawings, it may be seen that the socket hitch assembly 64 is operably coupled to a ball hitch element 90 carried atop a fifth wheel hitch assembly 92 mounted within the load bed 94 of a pickup truck referred to in general by the reference numeral 96. The pickup truck 96 includes opposite side longitudinal frame members 98 and 100 from which the load bed 94 is supported and the load bed 94 includes a flooring 102 overlying the frame members 98 and 100.

The hitch assembly 92 includes a pair of opposite side horizontal front-to-rear extending angle members 106 braced by front and rear transverse brace members 108 and 110 extending and secured between the front and rear ends, respectively, of the angle members 106. In addition, a pair of front and rear uprights 112 and 114 have their lower ends anchored relative to each angle member 106 and an upper horizontal transverse bar 116 has its opposite ends anchored between the corresponding uprights 112 and 114, the ball hitch element 90 being supported from the longitudinal mid-portion of the transverse bar 116. Further, a pair of rearwardly and upwardly inclined braces 118 are secured between the upper portions of the forward uprights 112 and forward ends of the angle members 106. Also, front and rear pairs of adjustable length cables 120 and 122 are secured between each opposite end portion of the transverse brace 116 and anchor plates 124 and 126 anchored to front and rear portions of the frame members 98 and 100 and projecting upwardly through the floor 102 of the load bed 94. The cables 120 and 122 incorporate turnbuckles whereby the tension of the cables 120 and 122 may be readily adjusted. Further, the cables 120, 122 may be replaced by chain sections, if desired.

It will also be noted that the frame is substantially entirely bolted together by bolts, clamp plates and various sleeves. Accordingly, the frame may be more readily repaired, when necessary.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claim as new is as follows:

1. A heavy load handling trailer incorporating a main frame including a main center longitudinal frame member having front and rear ends, towing tongue means carried by the front end of said center frame member and projecting forwardly therefrom, the rear end portion of said center frame member including three central longitudinally spaced and transverse load support members anchored relative thereto and projecting outwardly of opposite sides of said center frame member, a pair of rear opposite side frame members extending between, bridging and anchored relative to corresponding end portion of said transverse members, front-to-rear extending sleeve means anchored relative to said center longitudinal frame member on one side thereof and also anchored to said transverse members, an elongated rear frame extension member adjustably telescoped into said sleeve means and projecting rearwardly of said center frame member and the rear ends of opposite side frame members, a rear transverse load support member carried by the rear end of said frame extension and projecting outwardly from the opposite sides thereto, said trailer frame including tandem axles dependently supported from said central longitudinally spaced transverse load support members, the rear ends of said opposite side members projecting rearwardly of the rear end of said center longitudinal frame member and the opposite ends of said rear transverse load support member including portions overlying and supported from the rear ends of said opposite side frame members when said rear frame extension member is forwardly retracted.

2. The trailer of claim 1 wherein at least one forward transverse load support member carried by said towing tongue means, said towing tongue means being supported from the forward end of said main longitudinal frame member for adjustable forward extension and rearward retraction relative thereto, the forward end portion of said towing tongue means including a generally vertically disposed upright terminating upwardly in a generally horizontal forwardly projecting neck portion supporting trailer hitch coupling means from its forward end portion.

3. The trailer of claim 2 including opposite side forwardly and upwardly inclined bracing members secured at their upper ends to opposite sides of said neck portion forward of said upright, secured at their lower ends to opposite sides of said towing tongue means rearward of said upright and secured along their mid-length portions to opposite sides of mid-height portions of said upright.

4. The trailer of claim 1 in combination with a pickup truck including a rear load bed and a rear axle beneath and intermediate the front and rear end portions of said load bed, a hitch assembly mounted from said load bed forward of said rear axle and projecting considerably upwardly from said load bed, said hitch assembly including an upper hitch element, the forward portion of said towing tongue means including a generally vertically disposed upright post terminating upwardly in a generally horizontally forwardly projecting neck portion supporting trailer hitch coupling means from its forward end portion, said trailer hitch coupling means being removably coupled to said hitch element.

5. The trailer and truck combination of claim 4 wherein said hitch assembly includes opposite side upright standards between whose upper ends a transverse brace is secured, said hitch element being mounted from the longitudinal central portion of said transverse brace.

6. The trailer and truck combination of claim 5 including opposite side pair of oppositely and downwardly directed adjustable length tension members anchored between the ends of said transverse brace and front and rear portions of said load bed.

7. A heavy load handling trailer incorporating a main frame including a main ceter longitudinal frame member having front and rear ends, towing tongue means carried by the front end of said center frame member and projecting forwardly therefrom, the rear end portion of said center frame member including three central longitudinally spaced and transverse load support members anchored relative thereto and projecting outwardly of opposite sides of said center frame member, a pair of rear opposite side frame members extending between, bridging and anchored relative to corresponding end portions of said transverse members, front-to-rear extending sleeve means anchored relative to said center longitudinal frame member on one side thereof and also anchored to said transverse members, an elongated rear frame extension member adjustably telescoped into said sleeve means and projecting rearwardly of said center frame member and the rear ends of opposite side frame members, a rear transverse load support member carried by the rear end of said frame extension and projecting outwardly from the opposite sides thereof, at least one forward transverse load support member carried by said towing tongue means, said towing tongue means being supported from the forward end of said main longitudinal frame member for adjustable forward extension and rearward retraction relative thereto, said trailer frame including tandem axles dependent supported from said central longitudinally spaced transverse load support member, the rear ends of said opposite side frame members projecting rearwardly of the rear end of said center longitudinal frame member and the opposite ends of said rear transverse load support member including portions overlying and supported from the rear ends of said opposite side frame members when said rear frame extension member is forwardly retracted.

8. A heavy load handling trailer incorporating a main frame including a main center longitudinal frame member having front and rear ends, towing tongue means carried by the front end of said center frame member and projecting forwardly therefrom, the rear end portion of said center frame member including three central longitudinally spaced and transverse load support members anchored relative thereto and projecting outwardly of opposite sides of said center frame member, a pair of rear opposite side frame members extending between, bridging and anchored relative to corresponding end portions of said transverse members, front-to-rear extending sleeve means anchored relative to said center longitudinal frame member on one side thereof and also anchored to said transverse members, an elongated rear frame extension member adjustably telescoped into said sleeve means and projecting rearwardly of said center frame member and the rear ends of opposite side frame members, a rear transverse load support member carried by the rear end of said frame extension and projecting outwardly from the opposite sides thereof, at least one forward transverse load support member carried by said towing tongue means, said towing tongue means being supported from the forward end of said main longitudinal frame member for adjustable forward extension and rearward retraction relative thereto, said trailer frame including tandem axles dependent supported from said central longitudinally spaced transverse load support member, a decking including at least a rear portion thereof supported from said three longitudinally spaced and transverse load support members, said center frame member projecting considerably forwardly of the forwardmost center frame member of said three central transverse load support members, at least two additional transverse load support members spaced along the forward end of said center frame member and extending transversely thereof, said decking including a forward portion supported from said additional transverse load support members.

9. The trailer of claim 8 wherein said towing tongue means includes a plurality of forward transverse load support members supported therefrom, mounted thereon for adjustable positioning therealong and projecting outwardly from the opposite sides of said towing tongue means.

* * * * *